(12) United States Patent
Byers et al.

(10) Patent No.: US 8,850,977 B2
(45) Date of Patent: Oct. 7, 2014

(54) COMPRESSIBLE PRINTING SLEEVE CARRIER AND METHOD OF MAKING

(71) Applicant: Day International, Inc., Plymouth, MI (US)

(72) Inventors: Joseph L. Byers, Inman, SC (US); William H. Haddock, Candler, NC (US); J. Ron Yarbrough, Hendersonville, NC (US); Samuel R. Shuman, Bozeman, MT (US)

(73) Assignee: Day International, Inc., Plymouth, MI (US)

( * ) Notice: Subject to any disclaimer, the term of this patent is extended or adjusted under 35 U.S.C. 154(b) by 24 days.

(21) Appl. No.: 13/786,882

(22) Filed: Mar. 6, 2013

(65) Prior Publication Data

US 2013/0183466 A1    Jul. 18, 2013

Related U.S. Application Data

(62) Division of application No. 11/962,222, filed on Dec. 21, 2007, now Pat. No. 8,413,580.

(51) Int. Cl.
| | | |
|---|---|---|
| *B41F 27/06* | (2006.01) | |
| *B41F 1/16* | (2006.01) | |
| *B29C 53/56* | (2006.01) | |
| *B41N 10/02* | (2006.01) | |

(52) U.S. Cl.
CPC ............. *B41F 27/06* (2013.01); *B29C 53/56* (2013.01); *B41N 10/02* (2013.01); *Y10S 428/909* (2013.01)
USPC ........................ 101/376; 101/401.1; 428/909

(58) Field of Classification Search
USPC ........... 101/375, 376, 401.1, 415.1, 483, 492; 428/909
See application file for complete search history.

(56) References Cited

U.S. PATENT DOCUMENTS

| | | |
|---|---|---|
| 3,467,009 A | 9/1969 | Ross |
| 3,676,288 A | 7/1972 | Hoyle |
| 3,730,794 A | 5/1973 | Ross |
| 3,983,287 A | 9/1976 | Goossen et al. |
| 4,093,764 A | 6/1978 | Duckett et al. |
| 4,174,244 A | 11/1979 | Thomas et al. |
| 4,303,721 A | 12/1981 | Rodriguez |
| 4,368,568 A | 1/1983 | Watanabe |

(Continued)

FOREIGN PATENT DOCUMENTS

| | | | |
|---|---|---|---|
| EP | 1164011 A2 | 12/1985 | |
| JP | 04345893 | * 12/1992 | ............... B41N 1/24 |

OTHER PUBLICATIONS

International Search Report and Written Opinion dated Mar. 18, 2009 pertaining to International Application No. PCT/US2008/086800 filed Dec. 15, 2008.

*Primary Examiner* — Ren Yan
*Assistant Examiner* — Marissa Ferguson Samreth
(74) *Attorney, Agent, or Firm* — Dinsmore & Shohl LLP

(57) ABSTRACT

A compressible printing sleeve carrier for use in offset lithography which is formed from a composite fiber-reinforced compressible polymer is provided. The printing sleeve carrier is formed by coating reinforcing filaments with a compressible polymer and winding the filaments around a mandrel to form a hollow cylindrical base, where the first portion of the base adjacent the inner surface contains the wound reinforcing filaments coated with the compressible polymer and the second portion of the base adjacent the outer surface contains the compressible polymer.

7 Claims, 6 Drawing Sheets

(56) References Cited

U.S. PATENT DOCUMENTS

| | | |
|---|---|---|
| 4,471,011 A | 9/1984 | Sporing |
| 4,574,697 A | 3/1986 | Feeley |
| 4,684,600 A | 8/1987 | Worns et al. |
| 4,770,928 A | 9/1988 | Gaworowski et al. |
| 4,812,357 A | 3/1989 | O'Rell et al. |
| 4,905,969 A | 3/1990 | Kurschner et al. |
| 5,066,537 A | 11/1991 | O'Rell et al. |
| 5,205,213 A | 4/1993 | Bresson |
| 5,347,927 A | 9/1994 | Berna et al. |
| 5,352,507 A * | 10/1994 | Bresson et al. ............ 428/35.9 |
| 5,440,981 A | 8/1995 | Vrotacoe et al. |
| 5,768,990 A | 6/1998 | Vrotacoe et al. |
| 6,224,526 B1 | 5/2001 | Stimmelmayr et al. |
| 6,536,342 B2 * | 3/2003 | Rodgers ....................... 101/379 |
| 6,691,614 B2 | 2/2004 | Bell et al. |
| 6,703,095 B2 | 3/2004 | Busshoff et al. |
| 6,769,363 B2 | 8/2004 | Vrotacoe et al. |
| 6,966,259 B2 | 11/2005 | Kanga et al. |
| 2003/0040237 A1 | 2/2003 | Cox et al. |
| 2003/0129384 A1 | 7/2003 | Kalchbrenner |
| 2010/0307356 A1 * | 12/2010 | Rossini ....................... 101/375 |

* cited by examiner

COMPRESSIBLE PRINTING SLEEVE CARRIER AND METHOD OF MAKING

CROSS-REFERENCE TO RELATED APPLICATIONS

This application is a divisional of U.S. patent application Ser. No. 11/962,222 filed Dec. 21, 2007, entitled COMPRESSIBLE PRINTING SLEEVE CARRIER AND METHOD OF MAKING. The entire contents of said application is hereby incorporated by reference.

BACKGROUND OF THE INVENTION

The present invention relates to a compressible printing sleeve carrier, and more particularly, to a method of making a compressible printing sleeve carrier which utilizes wound filaments coated with a compressible polymer to provide substantially all of the structural properties of a carrier and substantially all of the compressible properties of a printing sleeve.

One of the most common commercial printing processes is offset lithography. In this printing process, ink is offset from a printing plate to a rubber-surfaced printing blanket or sleeve before being transferred to a substrate, such as paper. Typically, where a sleeve is used, the printing sleeve is constructed separately using a thin metal cylindrical base or carrier, and then the layers comprising the sleeve are attached to the carrier, such as one or more compressible layers, one or more reinforcing layers, and an outer printing surface layer.

However, the use of metal as a carrier for printing sleeves is expensive, and metal carriers are susceptible to damage both during production and in use due to their thin structure. In recent years, the use of reinforced polymeric carriers has been proposed for use as a base for printing sleeves. Polymeric carriers are less expensive than metal carriers, can be easily made to any desired size, and are less susceptible to damage during production and use. However, current methods of making polymeric carriers require that the carrier be constructed separately and completely cured prior to the addition of any subsequent layers typically used in printing sleeve constructions.

Accordingly, there is still a need in the art for a printing sleeve carrier which is inexpensive and simple to produce, and which provides desirable structural and compressible properties.

SUMMARY OF THE INVENTION

Embodiments of the present invention meet that need by providing a compressible printing sleeve carrier for use in offset lithography which is formed from a composite fiber-reinforced compressible polymer. The printing sleeve carrier provides all of the necessary structural properties provided by conventional printing sleeve carriers and also provides substantially all of the required compressibility of a conventional printing sleeve.

According to one aspect of the present invention, a compressible printing sleeve carrier is provided comprising a hollow cylindrical base having inner and outer surfaces comprised of a composite fiber-reinforced compressible polymer. A first portion of the base adjacent the inner surface of the base contains wound reinforcing filaments coated with the compressible polymer and a second portion of the base adjacent the outer surface thereof comprises the compressible polymer.

The compressible polymer is preferably selected from polyurethane, polyvinyl ester, polyester, epoxy, and polyamide. The compressible polymer preferably includes a void producing material therein selected from microspheres, blowing agents, or a combination thereof.

The wound filaments are preferably selected from fiberglass, carbon fibers, metallic fibers, and aramid fibers. Alternatively, the wound filaments may comprise cords.

In one embodiment of the invention, the wound reinforcing filaments further include a substantially void-free polymer coating thereon.

In another embodiment of the invention, the first portion of the base comprises a first layer of wound reinforcing filaments coated with a substantially void-free polymer and a second layer on the first layer comprising wound reinforcing filaments coated with the compressible polymer.

In yet another embodiment of the invention, the first portion of the base comprises a plurality of alternating layers of wound reinforcing filaments coated with a substantially void-free polymer and a layer of wound reinforcing filaments coated with a compressible polymer.

The compressible printing sleeve carrier preferably has a compliancy of from about 10 to 70 lbs/in. about (4.5 to 31.75 kg/cm), and more preferably, from about 35 to 51 lbs/in. (about 15.87 to 23.13 kg/cm).

The present invention also provides a method of making a compressible printing sleeve carrier in which a continuous source of reinforcing filaments is provided and coated with a compressible polymer; the coated reinforcing filaments are wound under tension around a mandrel to form a carrier comprising a hollow cylindrical base having inner and outer surfaces; where a first portion of the base adjacent the inner surface thereof contains the wound reinforcing filaments coated with the compressible polymer and a second portion of the base adjacent the outer surface thereof comprises the compressible polymer.

The method preferably includes curing the printing sleeve carrier. Curing may be initiated by exposing the printing sleeve carrier to a curing source comprising UV radiation, chemicals or heat to cure the compressible polymer.

In one embodiment, the method includes coating the reinforcing filaments with a substantially void-free polymer to wet the filaments prior to coating the filaments with the compressible polymer.

In another embodiment of the invention, the method includes coating the reinforcing filaments with a substantially void-free polymer and winding the filaments on the mandrel to form a first layer and coating the filaments with the compressible polymer and winding the filaments on the mandrel to form a second layer. In this embodiment, the method preferably includes partially curing the first layer prior to forming the second layer.

Accordingly, it is a feature of embodiments of the present invention to provide a compressible printing sleeve carrier which is formed from a composite fiber-reinforced compressible polymer. Other features and advantages of the invention will be apparent from the following description, the accompanying drawings, and the appended claims.

DETAILED DESCRIPTION OF THE PREFERRED EMBODIMENTS

Figure 1A:
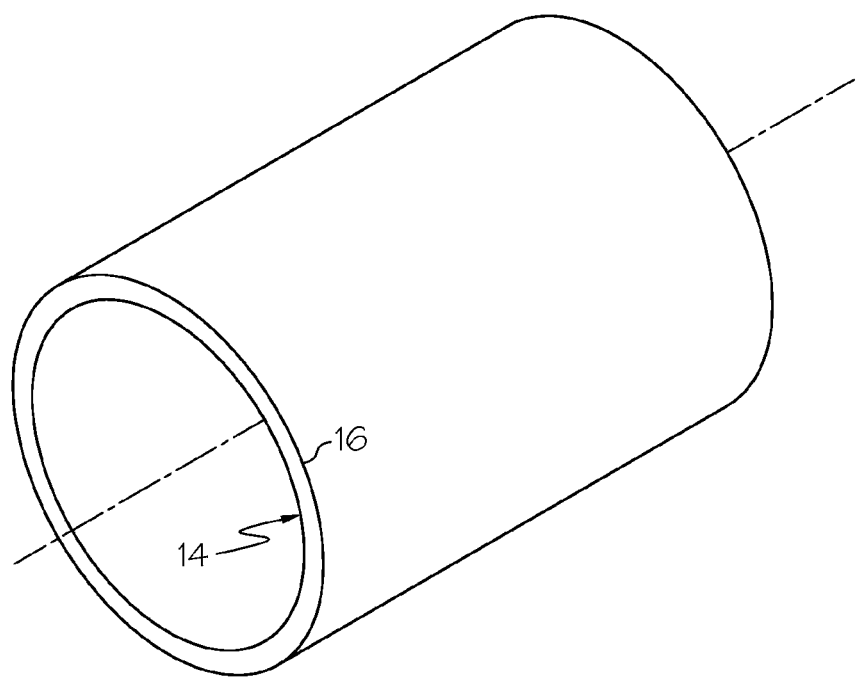
FIG. 1A is a perspective view of one embodiment of the printing sleeve carrier of the invention.

The compressible printing sleeve carrier of the present invention provides advantages over conventional metal sleeves in that it is less expensive to produce, it can be manufactured in any size, and is less likely to be damaged during handling. The sleeve carrier also provides an advantage over current polymeric printing sleeves which require separate construction of the carrier prior to the application of the layers comprising the sleeve, for example, compressible layers. The method of the present invention allows construction of the sleeve carrier without requiring separate steps to form the carrier and sleeve while providing all of the necessary structural properties and the required compressibility to the sleeve. The carrier is ready to receive one or more (optional) reinforcing layers and a print surface layer to provide a final blanket sleeve product.

The polymers for use in the printing sleeve carrier include polymers which act as a binder for the wound reinforcing materials. Suitable polymers include, but are not limited to, polyurethanes, polyvinyl esters, polyesters, epoxies, and polyamides.

Volume compressible properties are provided to the polymers by the incorporation of void-producing materials such as microspheres, blowing agents, or a combination of both. Suitable microspheres include low or high temperature microspheres known in the art. Suitable microspheres include those known by the trademark EXPANCEL microspheres from Expancel of Sundsvall, Sweden. Such microspheres have a shell consisting basically of a copolymer of vinylidene chloride and acrylonitrile, and contain gaeous isobutane. Other microspheres possessing the desired properties of compressibility can also be employed, such as those disclosed in U.S. Pat. No. 4,770,928.

The polymers are preferably in the form of liquid resins at room temperature and the microspheres are incorporated into the polymer solution preferably by mixing. At the time of filament coating, the solution is preferably heated (e.g., about 60° C.) to reduce the viscosity of the liquid resin to simplify the coating procedure.

The compressibility of the sleeve can be varied by the selection, size and amount of microspheres or other void-producing material used in the polymeric material.

In embodiments where the filaments are coated with a substantially void-free (non-compressible) polymer, suitable polymers include polyurethanes, polyvinyl esters, polyesters, epoxies, and polyamides.

Suitable reinforcing filaments for use in the invention include fiberglass, carbon fibers, metallic fibers, and aramid fibers. Alternatively, the filaments may comprise cords such as fiberglass rovings. In a preferred embodiment, the reinforcing filaments are provided in the form of fiberglass rovings.

In certain embodiments, the filaments may be selected to help impart compressibility to the sleeve, for example, in embodiments where the sleeve carrier is formed from multiple layers of wound filaments coated with a compressible polymer which are partially cured between the application of each layer of filaments. Such compressible filaments include materials such as polyester or aramid twisted textile cords. The compressible properties of such filaments is preserved by placing them in a layer structure as described above such that they are placed between compressible polymer layers.

Figure 1B:
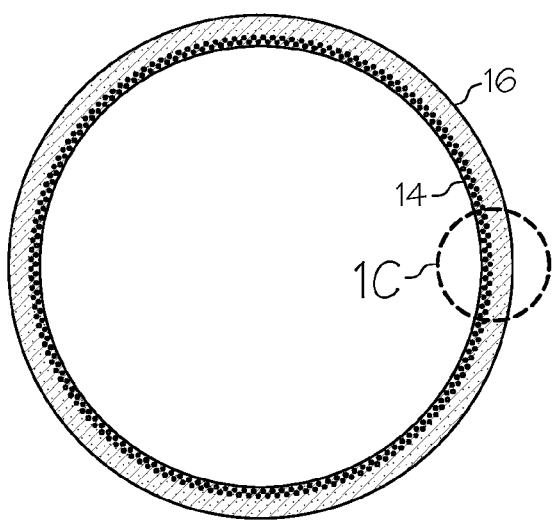
FIG. 1B is a cross-sectional view of the compressible printing sleeve carrier of FIG. 1A.
Figure 1C:
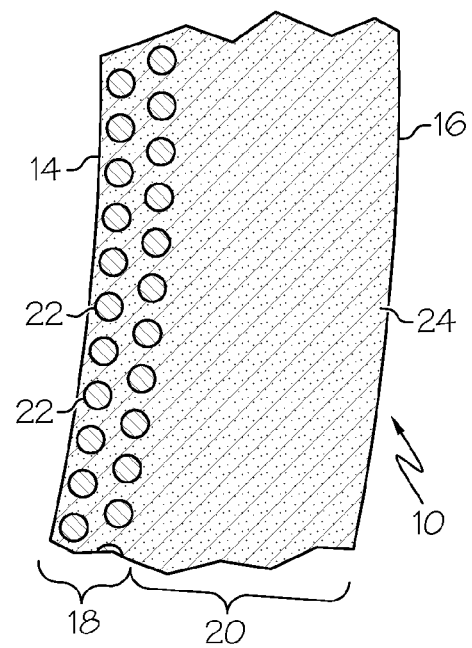
FIG. 1C is an enlarged cross-section of the compressible printing sleeve carrier of FIG. 1B.

Referring now to FIGS. 1A and 1B, one embodiment of the compressible printing sleeve carrier 10 is illustrated. As shown, the carrier comprises a hollow cylindrical base having inner and outer surfaces 14 and 16. As shown, a first portion 18 of the base adjacent the inner surface 14 includes wound reinforcing filaments 22 coated with a compressible polymer 24 and a second portion 20 adjacent the outer surface 16 which includes only the compressible polymer 24.

Figure 2:
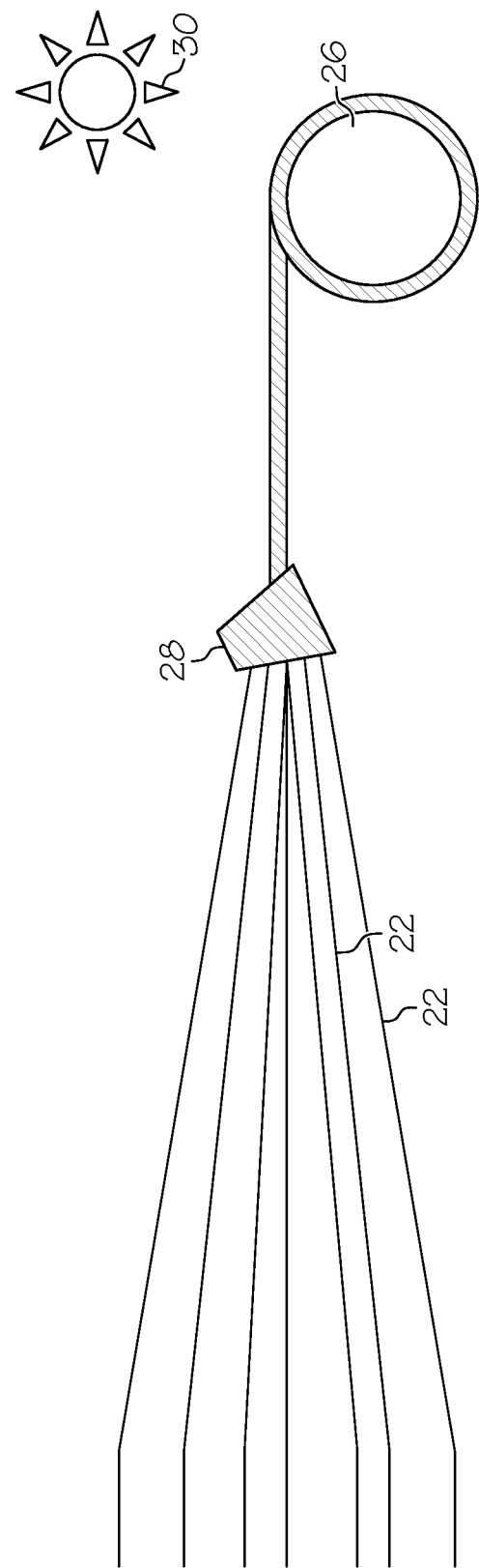
FIG. 2 is a schematic view illustrating a method of forming a compressible printing sleeve carrier in accordance with the embodiment shown in FIG. 1.

FIG. 2 illustrates the method of making this embodiment of the compressible printing sleeve carrier. A supply of wound filaments 22 is provided from a source (not shown) and is passed through a bath 28 containing the compressible polymer and a void-producing material. The coated filaments containing the compressible polymer coating are then wound onto a mandrel 26. It should be appreciated that during the winding process, the polymeric coating, while surrounding the filaments, tends to flow above the filaments such that the resulting structure has the filaments at the base of the sleeve while the second portion 20 contains only the compressible polymer as shown in FIG. 1A. After the filaments have been wound on the mandrel, the mandrel is then exposed to a curing source 30 where curing is initiated. Curing is preferably initiated by exposure of the carrier to a curing source such as UV radiation, chemicals or heat. The cured layer is then preferably dimensionally sized by grinding, such as by cylindrical grinding to aid in sleeve performance.

Figure 3A:
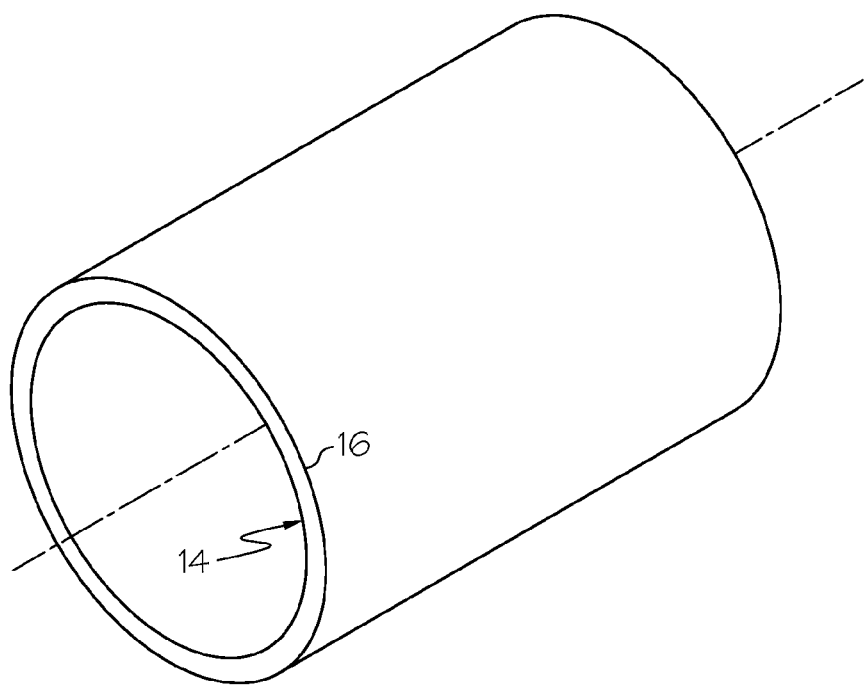
FIG. 3A is a perspective view of another embodiment of the printing sleeve carrier of the invention.
Figure 3B:
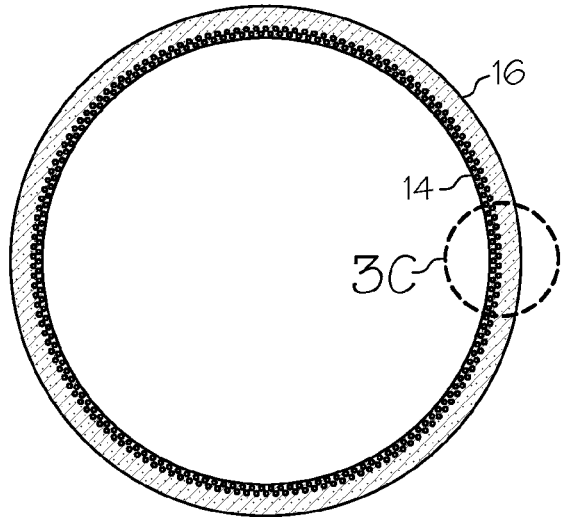
FIG. 3B is a cross-sectional view of the compressible printing sleeve carrier of FIG. 3A.
Figure 3C:
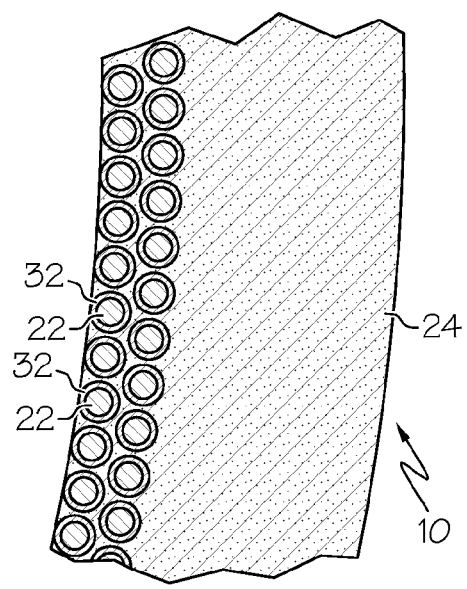
FIG. 3C is an enlarged cross-section of the compressible printing sleeve carrier of FIG. 3B.
Figure 4:
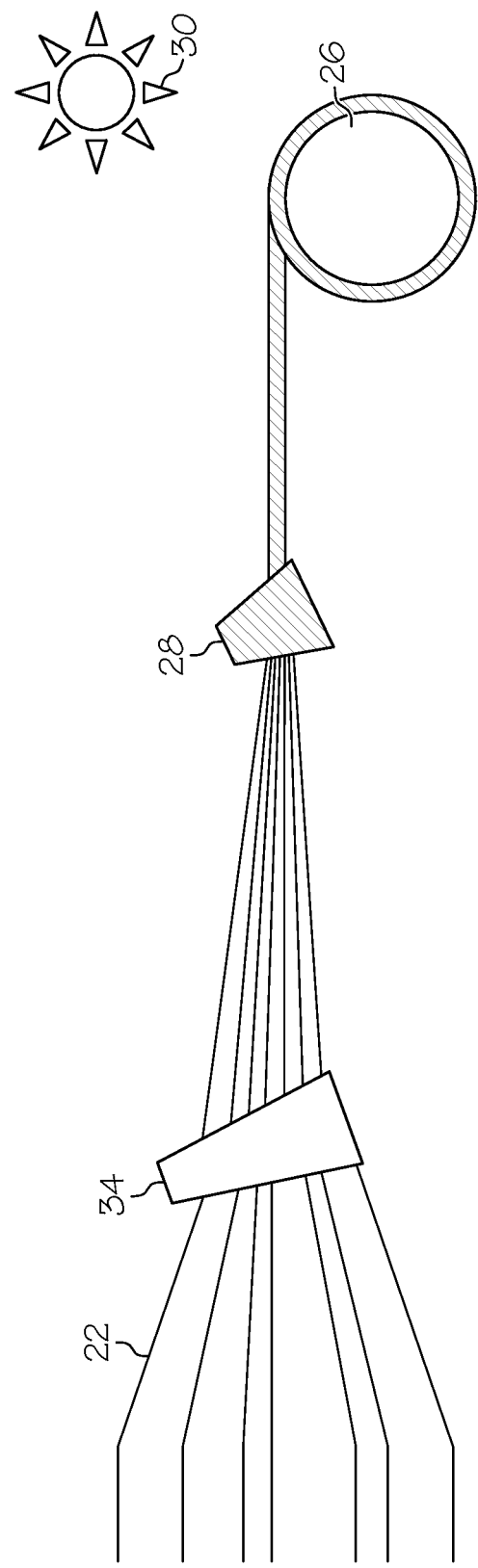
FIG. 4 is a schematic view illustrating a method of forming the compressible printing sleeve carrier in accordance with the embodiment shown in FIG. 3.

In an alternative embodiment illustrated in FIG. 3, the printing sleeve carrier 10 includes wound reinforcing filaments 22 which have been coated with a substantially void-free polymer 32 prior to being coated with the compressible polymer 24. As shown in FIG. 4, this embodiment is achieved by passing filaments 22 through a bath 34 containing the substantially void-free polymer which functions to wet out the filaments so that when they pass through bath 28, the compressible polymer will sufficiently wet the filaments.

Figure 5A:
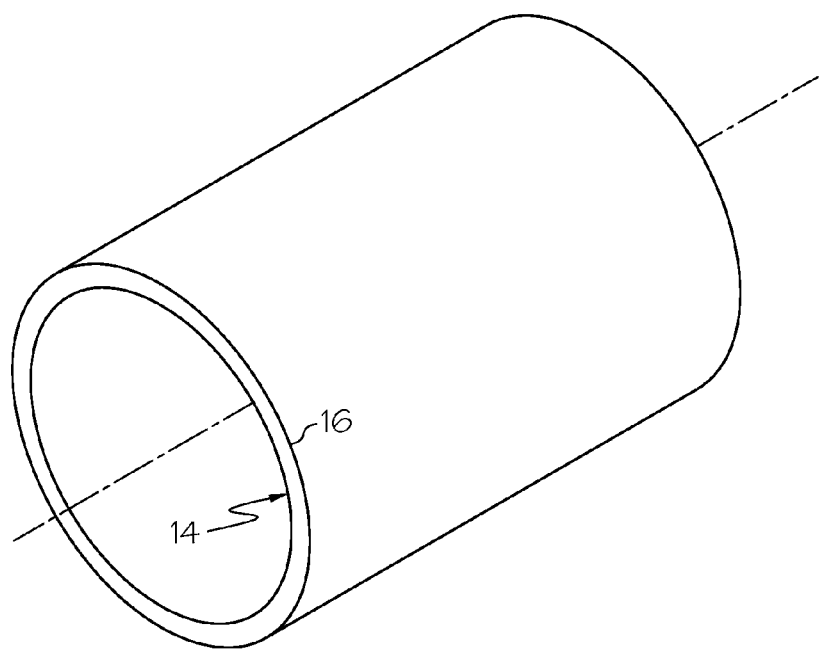
FIG. 5A is a perspective view of another embodiment of the printing sleeve carrier of the invention.
Figure 5B:
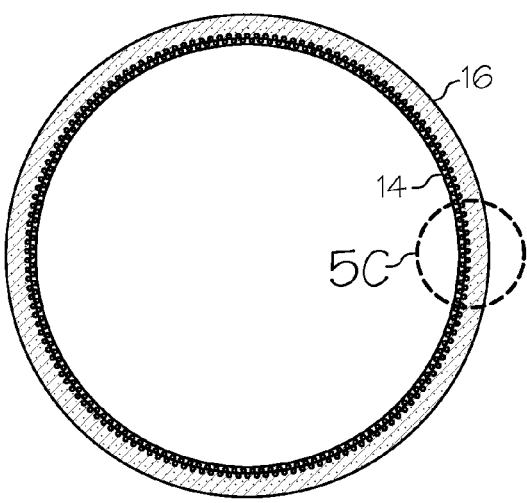
FIG. 5B is a cross-sectional view of the compressible printing sleeve carrier of FIG. 5A.
Figure 5C:
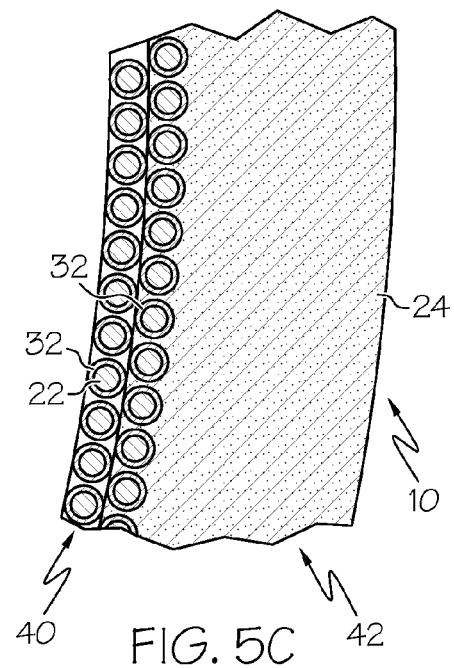
FIG. 5C is an enlarged cross-section of the compressible printing sleeve carrier of FIG. 5B.

In yet another embodiment illustrated in FIG. 5, the printing sleeve carrier 10 includes at least two layers of wound reinforcing filaments. The first layer 40 comprises wound filaments 22 which have been coated only with a substantially void-free polymer 32 while the second layer 42 comprises wound filaments which have been coated with both the substantially void-free polymer 32 and the compressible polymer 24.

Figure 6:
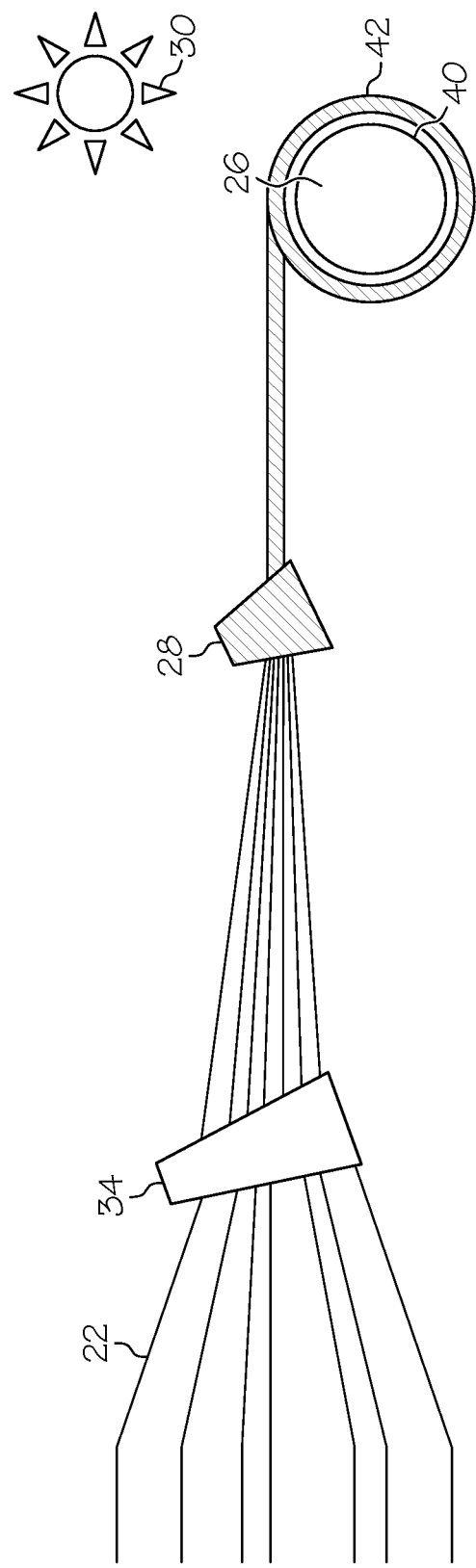
FIG. 6 is a schematic view illustrating a method of forming the compressible printing sleeve carrier in accordance with the embodiment shown in FIG. 5.

As shown in FIG. 6, reinforcing filaments 22 through bath 34 containing the substantially void-free polymer and are wound around mandrel 26 to form first layer 40 prior to introducing the filaments through both bath 34 and bath 28 containing the compressible polymer to form second layer 42.

It should be appreciated that the first layer may be formed at a separate coating station from the second layer. For example, the first layer may be formed on a first mandrel, at least partially cured, and then mounted on a separate mandrel (as shown) where filaments are wound through bath 34 and 28 and then wound on the mandrel to form the second layer. Each layer is preferably at least partially cured via curing source 30 prior to application of subsequent layers.

This method may be used to provide a plurality of alternating layers of non-compressible wound filaments and compressible wound filaments.

Having described the invention in detail and by reference to preferred embodiments thereof, it will be apparent that modifications and variations are possible without departing from the scope of the invention.

What is claimed is:

1. A compressible printing sleeve carrier comprising:
a hollow cylindrical base having inner and outer surfaces, a first portion of said hollow cylindrical base adjacent said inner surface thereof comprising a first non-compressible layer of continuous reinforcing filaments coated with a substantially void-free polymer and wound around said hollow cylindrical base and a second compressible layer on said first layer comprising continuous reinforcing filaments coated with a volume compressible polymer and wound around said hollow cylindrical base.

2. The compressible printing sleeve carrier of claim 1 comprising a plurality of alternating layers of said non-compressible and compressible layers.

3. The compressible printing sleeve carrier of claim 1 wherein said volume compressible polymer includes a void producing material therein selected from microspheres, blowing agents, or a combination thereof.

4. The compressible printing sleeve carrier of claim 1 wherein said continuous reinforcing filaments are selected from fiberglass, carbon fibers, metallic fibers, and aramid fibers.

5. The compressible printing sleeve carrier of claim 1 wherein said continuous reinforcing filaments comprise cords.

6. The compressible printing sleeve carrier of claim 1 wherein said volume compressible polymer is selected from urethane, vinyl ester, polyester, epoxy, and nylon.

7. The compressible printing sleeve carrier of claim 1 wherein said substantially void-free polymer is selected from the group consisting of polyurethane, polyvinyl esters, polyesters, epoxies, and polyamides.

* * * * *